United States Patent
Shur

(10) Patent No.: US 12,531,353 B2
(45) Date of Patent: Jan. 20, 2026

(54) LINE-OF-SIGHT DETECTOR AND COMMUNICATION SYSTEM IN SUB-THz AND THz RANGES

(71) Applicant: Rensselaer Polytechnic Institute, Troy, NY (US)

(72) Inventor: Michael Shur, Vienna, VA (US)

(73) Assignee: Rensselaer Polytechnic Institute, Troy, NY (US)

( * ) Notice: Subject to any disclaimer, the term of this patent is extended or adjusted under 35 U.S.C. 154(b) by 362 days.

(21) Appl. No.: 18/026,668

(22) PCT Filed: Sep. 29, 2021

(86) PCT No.: PCT/US2021/052548
§ 371 (c)(1),
(2) Date: Mar. 16, 2023

(87) PCT Pub. No.: WO2022/072423
PCT Pub. Date: Apr. 7, 2022

(65) Prior Publication Data
US 2023/0352853 A1    Nov. 2, 2023

Related U.S. Application Data

(60) Provisional application No. 63/084,761, filed on Sep. 29, 2020.

(51) Int. Cl.
*H01Q 23/00*    (2006.01)
*G01S 3/04*    (2006.01)
(Continued)

(52) U.S. Cl.
CPC .......... *H01Q 23/00* (2013.01); *G01S 3/043* (2013.01); *G01S 3/74* (2013.01); *H10F 30/282* (2025.01)

(58) Field of Classification Search
CPC .......... G01S 3/043; G01S 3/74; H01Q 23/00; H10F 30/28; H10F 30/282; H10F 77/413
See application file for complete search history.

(56) References Cited

U.S. PATENT DOCUMENTS

| 9,118,356 B2 | 8/2015 | Michalske et al. |
| 10,211,511 B2 * | 2/2019 | Kim .......... G01J 5/20 |

(Continued)

FOREIGN PATENT DOCUMENTS

| WO | WO-2015188608 A1 * | 12/2015 | ............. H01L 31/02 |
| WO | 2020012455 A1 | 1/2020 | |

OTHER PUBLICATIONS

International Search Report and The Written Opinion of the International Searching Authority, International Application No. PCT/US2021/052548, mailed Dec. 27, 2021.

(Continued)

*Primary Examiner* — David J Makiya
*Assistant Examiner* — Miya Downing
(74) *Attorney, Agent, or Firm* — Barclay Damon LLP; Anthony P. Gangemi

(57) ABSTRACT

One embodiment provides a line of sight detector. The line of sight detector includes a first TeraFET (field effect transistor) including a first source, a first drain, a first gate, and a first channel having a first end and a second end. The line of sight detector further includes a first source antenna coupled to the first source; a first drain antenna coupled to the first drain; and a third antenna. Each antenna is configured to receive an incident radiation signal having a frequency in a sub terahertz or a terahertz frequency range. Each antenna is positioned a respective distance from each other antenna. Each distance is less than one wavelength of the incident radiation signal.

20 Claims, 6 Drawing Sheets

(51) Int. Cl.
    *G01S 3/74*     (2006.01)
    *H10F 30/282*     (2025.01)

(56) References Cited

U.S. PATENT DOCUMENTS

| | | |
|---|---|---|
| 10,418,721 B2 | 9/2019 | Chattopadhyay et al. |
| 10,452,571 B2 | 10/2019 | Oster et al. |
| 10,476,545 B2 | 11/2019 | Elsherbini et al. |
| 2008/0026697 A1* | 1/2008 | Signell .................. H01Q 21/28 |
| | | 455/66.1 |
| 2014/0091376 A1 | 4/2014 | Boppel et al. |
| 2016/0305823 A1* | 10/2016 | Ignjatovic ............. G01J 5/0837 |
| 2018/0212306 A1 | 7/2018 | Elsherbini et al. |
| 2019/0013960 A1 | 1/2019 | Sadwick |
| 2021/0057534 A1* | 2/2021 | Shur .................. H10D 30/6892 |

OTHER PUBLICATIONS

Liu, X., et al., "Plasmonic FET Terahertz Spectrometer," IEEE Access, vol. 8, pp. 56039-56044, Mar. 2020.

\* cited by examiner

LINE-OF-SIGHT DETECTOR AND COMMUNICATION SYSTEM IN SUB-THz AND THz RANGES

CROSS REFERENCE TO RELATED APPLICATION(S)

This application claims the benefit of U.S. Provisional Application No. 63/084,761, filed Sep. 29, 2020, which is incorporated by reference as if disclosed herein in its entirety.

GOVERNMENT LICENSE RIGHTS

This invention was made with government support under grant number FA9550-19-1-0355, awarded by the Air Force Office of Scientific Research. The government has certain rights in the invention.

FIELD

The present disclosure relates to a line-of-sight detector, in particular to, a line-of-sight detector and communication system in sub-THz (terahertz) and THz ranges.

SUMMARY

In some embodiments, there is provided a line of sight detector. The line of sight detector includes a first TeraFET (field effect transistor) including a first source, a first drain, a first gate, and a first channel having a first end and a second end. The line of sight detector further includes a first source antenna coupled to the first source; a first drain antenna coupled to the first drain; and a third antenna. Each antenna is configured to receive an incident radiation signal having a frequency in a sub terahertz or a terahertz frequency range. Each antenna is positioned a respective distance from each other antenna. Each distance is less than one wavelength of the incident radiation signal.

In some embodiments of the line of sight detector, a distance between the first source antenna and the first drain antenna is between one eighth and one quarter of the wavelength of the incident radiation signal.

In some embodiments of the line of sight detector, a width of the first channel varies.

In some embodiments of the line of sight detector, the first channel is an angled channel having a first portion and a second portion coupled at an angle point. The third antenna is coupled to the first channel at the angle point. A first end of the first portion is coupled to the first source antenna. A second end of the second portion is coupled to the first drain antenna.

In some embodiments, the line of sight detector includes a second TeraFET including a second source, a second drain, a second gate, and a second channel. The second source is coupled to the first drain antenna. The second drain is coupled to the third antenna. The second channel is oriented at an angle relative to the first channel.

In some embodiments, the line of sight detector includes a second TeraFET, and a fourth antenna. The second TeraFET including a second source, a second drain, and a second gate, the third antenna coupled to the second source, and the fourth antenna coupled to the second drain.

In some embodiments, the line of sight detector includes a fourth antenna. The first TeraFET further includes a second source and a second drain. The third antenna is coupled to the second source. The fourth antenna is coupled to the second drain. The channel has a cross shape.

In some embodiments, the line of sight detector includes a second channel coupled between the first source antenna and the third antenna; a number of other channels; and the number of other drain antennas. Each other channel is coupled between the first source antenna and a respective other drain antenna. An arrangement of the drain antennas is configured to facilitate simultaneous determination of respective directions to a plurality of incident signal sources.

In some embodiments of the line of sight detector, the first TeraFET includes a material selected from the group including Si (silicon), GaAs (gallium-arsenide), GaN (gallium nitride), and graphene.

In some embodiments, the line of sight detector includes a second TeraFET, a third TeraFET, and a fourth antenna. The second TeraFET is coupled between the first drain antenna and the third antenna. The third TeraFET is coupled between the first drain antenna and the fourth antenna. Each TeraFET is oriented perpendicular to each other TeraFET to within manufacturing tolerances, and configured to determine a direction to a source of incident radiation in three-dimensional space.

In some embodiments, there is provided a system for line of sight signal detection. The system includes a detection circuitry including a line of sight detector; and a detection module configured to determine a line of sight direction to a transmitting source based, at least in part, on an output of the detection circuitry. The line of sight detector includes a first TeraFET (field effect transistor) including a first source, a first drain, a first gate, and a first channel having a first end and a second end. The line of sight detector further includes a first source antenna coupled to the first source; a first drain antenna coupled to the first drain; and a third antenna. Each antenna is configured to receive an incident radiation signal having a frequency in a sub terahertz or a terahertz frequency range. Each antenna is positioned a respective distance from each other antenna. Each distance is less than one wavelength of the incident radiation signal.

In some embodiments of the system, a distance between the first source antenna and the first drain antenna is between one eighth and one quarter of the wavelength of the incident radiation signal.

In some embodiments of the system, a width of the first channel varies.

In some embodiments of the system, the detection circuitry includes a plurality of line of sight detectors arranged in a focal plane array.

In some embodiments of the system, the detection module is configured to provide the determined line of sight direction to a directional antenna subsystem.

In some embodiments of the system, the detection module is configured to determine a signal strength of the incident radiation signal.

In some embodiments, the system further includes a calibration module configured to determine calibration data including a respective detection circuitry output for each orientation of a calibration transmitting source relative to the line of sight detector. The line of sight direction to a transmitting source is determined based, at least in part, on the calibration data.

In some embodiments of the system, the detection circuitry further includes a second TeraFET, a third TeraFET, and a fourth antenna. The second TeraFET is coupled between the first drain antenna and the third antenna. The third TeraFET is coupled between the first drain antenna and the fourth antenna. Each TeraFET is oriented perpendicular to each other TeraFET to within manufacturing tolerances, and is configured to determine a direction to a source of incident radiation in three-dimensional space.

In some embodiments of the system, the detection circuitry further includes a second channel coupled between the first source antenna and the third antenna; a number of other channels; and the number of other drain antennas, each other channel coupled between the first source antenna and a respective other drain antenna, an arrangement of the drain antennas configured to facilitate simultaneous determination of respective directions to a plurality of incident signal sources.

In some embodiments of the system, the first TeraFET includes a material selected from the group including Si (silicon), GaAs (gallium-arsenide), GaN (gallium nitride), and graphene.

BACKGROUND

Wireless communication networks communicate via electromagnetic waves ("carriers") transmitted from one or more transmitting antennas to one or more receiving antennas. Information is carried by these electromagnetic waves. Each electromagnetic wave has an associated bandwidth that is related to a carrier frequency. Generally, increasing the carrier frequency yields an increase in bandwidth. Increasing the bandwidth provides an increase in information carrying capacity, and a corresponding increase in download speeds. However, increased carrier frequencies are also subject to increased signal attenuation, thus, reducing an allowable distance between transmitting and receiving antennas.

Wireless communication networks may include, for example, cellular telephone networks (e.g., compatible with 3GPP ($3^{rd}$ Generation Partnership Project) and/or ITU (International Telecommunication Union) technical specifications (e.g., 3G, 4G, LTE (Long Term Evolution), 5G, 6G, etc.), local area networks (e.g., compatible with IEEE 802.11 standards), ad-hoc networks, sensor networks, IoT (Internet of Things) networks, etc. Each technical specification and/or standard generally includes constraints on carrier frequencies, i.e., frequency ranges ("frequency bands") for carrier signals. For example, 5G carrier frequencies are constrained to frequency bands that are included in the frequency range of about 600 MHz (megahertz) to about 40 GHz (gigahertz). Carrier frequencies likely will continue to increase to achieve an increase in bandwidth to support increased usage associated with the various network applications. It is contemplated that carrier frequencies may reach frequencies of 10's of GHz, 100's of GHz (i.e., sub-THz (terahertz)), 1's of THz, and possibly higher.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
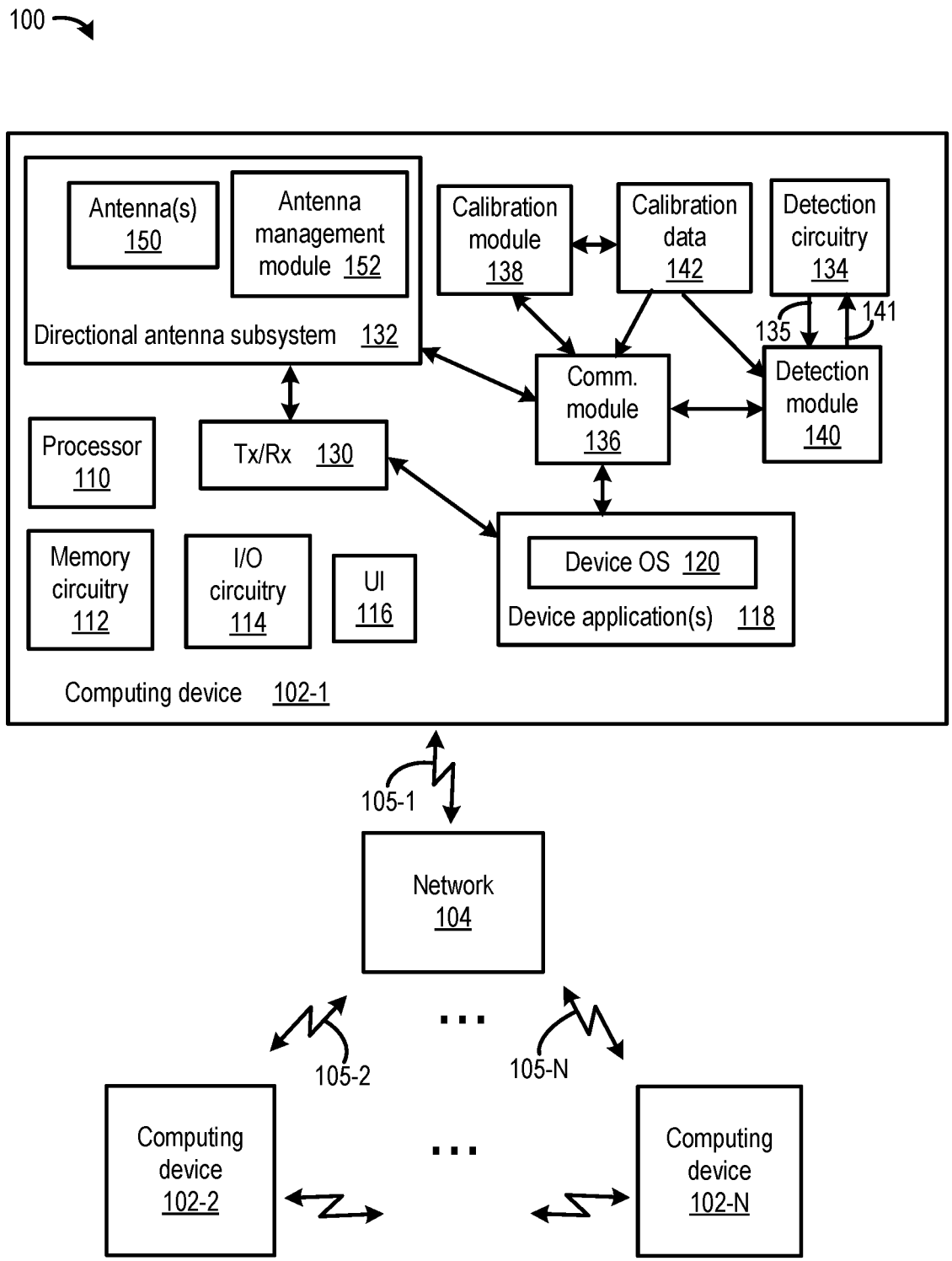
FIG. 1 illustrates a functional block diagram of a wireless communication system, consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

In part due to attenuation characteristics, sub-THz and/or THz communication may generally occur over paths that are "line-of-sight", i.e., without obstacles between the transmitting and receiving antennas. Additionally or alternatively, sub-THz and/or THz communication may be established or facilitated by adjusting a radiation pattern of the transmitting and/or receiving antenna(s) to achieve such line-of-sight communication. In other words, the radiation pattern(s) may be adjusted so that respective main lobes of the transmitting and receiving antennas are aligned. For example, the radiation pattern(s) may be adjusted by adjusting an orientation of the transmitting or receiving antenna. In another example, the radiation pattern(s) may be adjusted electronically by steering the main lobe via, for example, a phased array.

It may be appreciated that a position (and orientation) of receiving antenna(s), relative to transmitting antenna(s) may not be known a priori. For example, the receiving antenna(s) and/or transmitting antenna(s) may be mobile. An ability to properly orient the respective main lobes may thus rely on detecting a direction of the receiving antenna(s) relative to the transmitting antenna.

Terahertz field effect transistors ("TeraFETs") may be configured to convert impinging (i.e., incident) terahertz (THz) radiation (i.e., incident radiation signal) into a dc current (and/or dc voltage) by using excitation of overdamped or resonant plasma oscillations. TeraFETs may be implemented in Si (silicon), GaAs (gallium-arsenide), GaN (gallium nitride), graphene, and/or other materials systems. TeraFETs may be utilized as tunable and relatively fast detectors of sub-THz and THz radiation. The underlying physical mechanism may be based on a rectification of plasmonic oscillations enabled by the device nonlinearity and an asymmetry of the configuration. Characteristics of the asymmetry may determine a direction of a dc current response (or a sign of an induced dc voltage). Asymmetry may be introduced by imposing different boundary conditions on a source and a drain of the TeraFET. For example, fixing a drain current (e.g., coupling an external circuit to the drain via an antenna or a contact pad with infinite inductive impedance) while exciting a source-gate input. Additionally or alternatively, identical antennas may be coupled to the source and drain with asymmetry introduced by applying signals with different amplitudes to the source and drain. The induced dc current may then be proportional to a difference between squared voltages at the source and drain (assuming the signals have a same phase). Additionally or alternatively, an asymmetry may be induced by a phase shift between the THz signals at the source and drain. For signals of equal amplitude applied to the source and drain, a nonzero phase shift, θ, between signals applied to the drain and source may induce a dc voltage proportional to a sine of the phase shift (multiplied by a square of the signal amplitude). Additionally or alternatively, with identical source and drain antennas, a dc voltage may be induced by linearly polarized radiation by changing an angle between incoming radiation and a plane of a device. A finite phase shift θ proportional to a sine of an incidence angle appears for a nonzero incidence angle φ (the proportionality coefficient in this equation depends on the geometry detail). This phase shift enters the boundary conditions for the electron fluid in the transistor channel, as described herein.

A description of an exemplary terahertz plasmonic detector controlled by phase asymmetry may be found in I. V. Gorbenko, V. Y. Kachorovskii, and M. Shur, "Terahertz plasmonic detector controlled by phase asymmetry," in Optics Express, vol. 27, no. 4, Feb. 18, 2019 (published Feb. 4, 2019), pp. 4004-4013, the entire contents of which are incorporated by reference herein.

Generally, this disclosure relates to a line-of-sight detector, in particular to, a line-of-sight detector and communication system in sub-THz (terahertz) and THz ranges. An apparatus, method and/or system are configured to detect a direction of an incident radiation signal source based, at least in part, on an induced voltage in at least one TeraFET. The induced voltage is related to an angle of the incident radiation impinging on a line of sight detector that includes the at least one TeraFET. In some embodiments, the line of sight detector may be configured to determine a frequency of the incident radiation signal. In some embodiments, the line of sight detector may be configured to determine a signal intensity of the incident radiation signal. The direction information may then be provided to a directional antenna subsystem, i.e., "main antenna", that may then be aimed based, at least in part, on the direction information. Thus, line of sight communication may be facilitated by a line of sight detector, according to the present disclosure.

In an embodiment, there is provided a line of sight detector. The line of sight detector includes a first TeraFET (field effect transistor) that includes a first source, a first drain, a first gate, and a first channel having a first end and a second end. The line of sight detector further includes a first source antenna coupled to the first source; a first drain antenna coupled to the first drain; and a third antenna. Each antenna is configured to receive an incident radiation signal having a frequency in a sub terahertz or a terahertz frequency range. Each antenna may positioned a respective distance from each other antenna. Each distance is less than one wavelength of the incident radiation signal.

FIG. 1 illustrates a functional block diagram of a wireless communication system 100 consistent with several embodiments of the present disclosure. Wireless communication system 100 includes a plurality of computing devices 102-1, 102-2, . . . , 102-N, coupled wirelessly via a network 104. Each computing device 102-1, 102-2, . . . , 102-N may be configured to communicate with one or more other computing devices wirelessly via network 104. Each computing device 102-1, 102-2, . . . , 102-N may be configured to transmit and/or receive a respective Terahertz (THz) or sub-THz signal 105-1, 105-2, . . . , 105-N.

Each computing device 102-1, 102-2, . . . , 102-N may include, but is not limited to, a mobile telephone including, but not limited to, a smart phone (e.g., iPhone®, Android®-based phone, etc.); a wearable device (e.g., wearable computer, "smart" watch, smart glasses, etc.) and/or system; a robotic vehicle (e.g., terrestrial, aquatic, aerospace, space, etc.); a network of robotic vehicles (e.g., a swarm); an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, Galaxy Tab®, Amazon Fire®, Microsoft Surface® and the like), an ultraportable computer, an ultra-mobile computer, a netbook computer and/or a subnotebook computer; etc.

Each computing device, e.g., computing device 102-1 may include a processor 110, a memory circuitry 112, an input/output (I/O) circuitry 114, a user interface (UI) 116, and one or more device application(s) 118. The device application(s) 118 may include a device operating system (OS) 120. Computing device 102-1 may further include a transceiver (Tx/Rx) 130, a directional antenna subsystem 132, a detection circuitry 134, a communication module 136, a calibration module 138, a detection module 140, and a calibration data 142 store. Directional antenna subsystem 132 includes one or more antenna(s) 150 and may include an antenna management module 152. Antenna(s) 150 may correspond to a "main antenna" of computing device 102-1, configured to provide wireless communication functionality for computing device 102-1. In some embodiments, one or more of detection circuitry 134, communication module 136, calibration module 138, detection module 140, and/or calibration data 142 store may be included in Tx/Rx 130.

Processor 110 is configured to perform one or more operations of device application(s) 118, communication module 136, calibration module 138, and/or detection module 140. Memory circuitry 112 is configured to store information and/or data associated with application(s) 118, modules 136, 138, 140, 152, and/or calibration data 142. UI 116 may include a user input device (e.g., keyboard, keypad, mouse, touchpad, touch sensitive display, microphone, etc.) and a user output device (e.g., a display, a loudspeaker, etc.).

I/O circuitry 114 and/or Tx/Rx 130 may be configured to communicate with one or more of a network, and/or another computing device. I/O circuitry 114 and/or Tx/Rx 130 may be configured to communicate wired and/or wirelessly and/or a combination thereof. I/O circuitry 114 and/or Tx/Rx 130 may be configured to comply and/or be compatible with one or more of a 3G, 4G and/or 5G cellular communication protocol and/or an IEEE 802.11 (e.g., Wi-Fi®) wireless communication protocol. In some embodiments, I/O circuitry 114 may be configured to communicate using a near field communication (NFC) protocol (e.g., Bluetooth®), when computing device 102-1 is in proximity to other computing device(s), etc.

Device application(s) 118 and/or OS 120 may be configured to generate data and/or information for transmission via Tx/Rx 130 and directional antenna subsystem 132 to a receiving computing device, e.g., computing device 102-2, via network 104. Device application(s) 118 and/or OS 120 may be configured to process data and/or information received from Tx/Rx 130 via directional antenna subsystem 132 and network 104 from a transmitting computing device, e.g., computing device 102-2. Device application(s) 118 may be configured to provide data and/or information to be transmitted from computing device 102-1 to Tx/Rx 130 and to receive data and/or information received by computing device 102-1 from Tx/Rx 130. Tx/Rx 130 is coupled to directional antenna subsystem 132 and is configured to modulate and transmit information from computing device 102-1 via directional antenna subsystem 132 (and antenna(s) 150). Tx/Rx 130 is further configured to receive modulated information from directional antenna subsystem 132 and to provide the received information to device OS 120 and/or device application(s) 118.

Directional antenna subsystem 132, i.e., antenna(s) 150 and antenna management module 152, may be configured to transmit and/or receive, electromagnetic signals modulated with information. The electromagnetic signals have frequencies in one or more frequency ranges. Frequency ranges may include, but are not limited to, frequencies in the range of about 600 MHz (megahertz) to about 40 GHz (gigahertz), frequencies of 10's of GHz, of 100's of GHz (i.e., sub-THz (terahertz)), of 1's of THz, and possibly higher. Antenna(s) 150 may include a single antenna or a plurality antennas arranged in an array. Transmission and/or reception of sub-THz and/or THz signals by antenna(s) 150 may be facilitated by aligning the radiation pattern of antenna(s) 150 with a partner antenna system. The partner antenna system may be associated with, for example, network 104 or another computing device 102-2, . . . , 102-N. It may be appreciated that a location, and thus a direction, of the partner antenna system relative to computing device 102-1 may not be known a priori and/or may change over time. Thus, detection module 140 and detection circuitry 134 may be configured to determine a direction of the partner antenna system, as described herein.

Communication module 136 may be configured to manage operation of detection module 140. For example, communication module 136 may be configured to initiate detection operations periodically, in response to detecting movement of computing device 102-1, in response to activity of device application(s) 118, and/or in response to a command from device OS 120. Communication module 136 may be configured to provide direction data to directional antenna subsystem 132 (e.g., antenna management module 152) that may then allow antenna(s) 150 to be aligned according to the provided direction data.

Generally, detection circuitry 134 may correspond to or may include a line of sight detector. Detection circuitry 134, and thus each line of sight detector, may contain at least one TeraFET. Each TeraFET may be coupled to at least one sub-terahertz or terahertz antenna. Detection circuitry 134 is configured to receive a control input 141 from detection module 140. In one nonlimiting example, the control input 141 may correspond to a tuning signal configured to adjust a detection frequency of the detection module 140 and associated TeraFET(s). Detection module 140 is configured to receive a detection circuitry output 135. The detection circuitry output 135 may include one or more TeraFET voltage(s) and/or current(s) corresponding to a received sub-terahertz or terahertz signal. Detection module 140 may then be configured to determine a direction of a corresponding signal source relative to computing device 102-1 based, at least in part, on calibration data 142.

Initially, calibration module 138 may be configured to perform calibration operations and to store results in calibration data 142. Calibration operations may include, for example, determining a relative orientation of detection circuitry 134 to antenna(s) 150. In another example, calibration operations may include determining a respective detection circuitry output 135 for each orientation of a calibration transmitting source relative to computing device 102-1. Continuing with this example, the calibration source may correspond to another computing device, e.g., computing device 102-2, that is oriented at each of a range of incident angles relative to a plane that contains computing device 102-1. The range of incident angles may be included in a two-dimensional array of incident angles corresponding to a first set of angles relative to an x-direction and a second set of angles relative to a y-direction, for an x, y plane. The calibration operations may be performed for the array of angles at each of a number of frequencies in an operating frequency band of system 100, including computing device 102-1, network 104, and/or computing devices 102-2, . . . , 102-N. For example, a relationship between TeraFET gate voltage and TeraFET output voltage may be determined to facilitate identifying the frequency of the incident radiation signal. Results of calibration operations may then be stored in calibration data 142, and utilized by communication module 136 and/or detection module 140 during normal operations.

The calibration operations performed and corresponding calibration data may vary with a detection circuitry 134 architecture. As used herein, the detection circuitry 134 architecture corresponds to a number of TeraFET(s) included in detection circuitry 134, and a particular physical arrangement and/or configuration of the TeraFET(s).

Detection module 140 and detection circuitry 134 are configured to determine a direction of an incident signal transmitting source based, at least in part, on calibration data 142. For example, detection module 140 may be configured to provide a control input to detection circuitry 134 configured to facilitate identifying a frequency of the incident signal, to capture an output voltage and to then determine a transmitting source direction based, at least in part, on calibration data. The transmitting source direction information may then be provided to communication module 136 and/or to directional antenna subsystem 132. Antenna management module 152 may then be configured to adjust a direction of the antenna(s) 150 to align with the transmitting source direction. Thus, transmission and reception between the transmitting source and computing device 102-1 may be optimized.

Figure 2A:
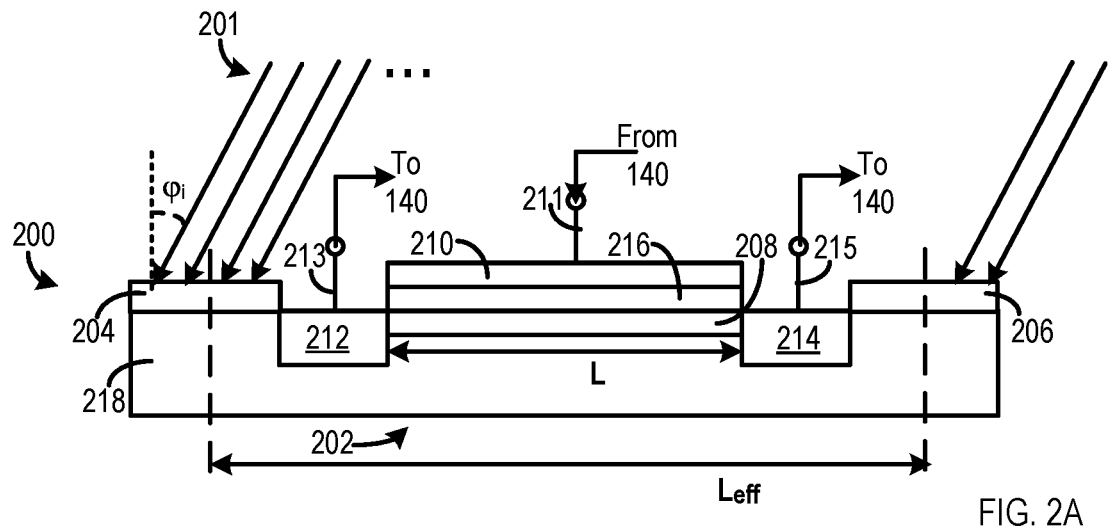
FIG. 2A is a sketch illustrating a side view of an example TeraFET architecture configured for terahertz signal detection, consistent with several embodiments of the present disclosure.

FIG. 2A is a sketch illustrating a side view 200 of an example TeraFET architecture configured for terahertz signal detection, consistent with several embodiments of the present disclosure. FIG. 2A further includes example incident (i.e., incoming) radiation 201 signal impinging on the example TeraFET architecture 200. In one nonlimiting example, the incoming radiation may be linearly polarized. The incident radiation 201 may be transmitted from a radiation source whose direction relative to TeraFET architecture 200 is to be determined.

TeraFET architecture 200 includes a TeraFET 202, a source antenna 204, and a drain antenna 206. Each antenna 204, 206 may be selected from the group comprising graphene antennas, carbon nanotube antennas, metallic antennas, dielectric antennas, planar antennas (e.g., butterfly, dual U-shaped, log periodic, etc.), patch antennas, on-chip antennas, and/or a combination thereof.

TeraFET 202 includes a channel 208, a gate 210, a source 212, a drain 214, a gate insulator 216, and a substrate 218. TeraFET 202 further includes a gate electrode 211 coupled to the gate 210, a source electrode 213 coupled to the source 212, and a drain electrode 215 coupled to the drain 214. The channel 208 as a length, L, and extends between the source 212 and the drain 214. The source antenna 204 is positioned on the substrate 218 adjacent the source 212. The drain antenna 206 is positioned on the substrate 218, adjacent the drain 214. In one nonlimiting example, the source antenna 204 and drain antenna 206 may be identical (to within manufacturing tolerances). A distance between the source antenna 204 and the drain antenna 206 corresponds to an effective length, $L_{eff}$, of the TeraFET architecture 200. In an embodiment, a distance between the source antenna 204 and drain antenna 206 may be between one eighth and one quarter of the wavelength of the incident radiation 201. In some embodiments, the source antenna 204 and the drain antenna 206 may be generally coplanar. In some embodiments, the drain antenna 206 may not be coplanar with the source antenna 204, i.e., the drain antenna 206 may be positioned in a plane with a nonzero angle relative to a plane of the source antenna 204. In the non-coplanar embodiments, the drain antenna 206 may not be positioned on the substrate 218.

The gate electrode 211 is configured to couple the gate 210 to an output of a detection module, e.g., detection module output 141 of detection module 140 of computing device 102-1 of FIG. 1. Thus, the gate 210 is configured to receive a control input from detection module 140, e.g., configured to adjust a detection frequency of TeraFET 202. The source electrode 213 and the drain electrode 215 are similarly configured to couple the source 212 and the drain 214, respectively, to the detection module, e.g., detection module 140. Thus, the source 212 and/or the drain 214 may provide detection circuitry output 135 to the detection module 140. Detection module 140 may then be configured to determine a direction of a received sub-terahertz or terahertz signal, based, at least in part, on an output from TeraFET 202, as described herein.

Figure 2B:
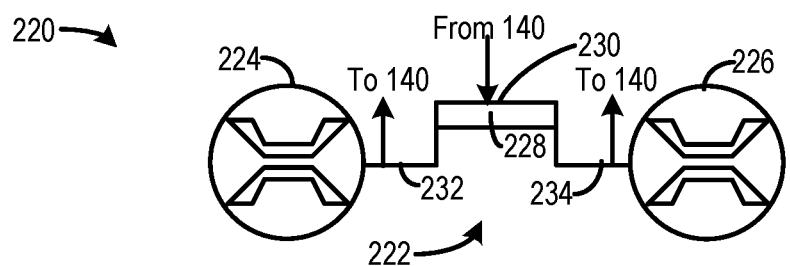
FIG. 2B is a sketch illustrating a symbolic view of the example TeraFET architecture of FIG. 2A.

FIG. 2B is a sketch illustrating a symbolic view 220 of the example TeraFET architecture 200 of FIG. 2A. The following may be best understood when considering FIGS. 2A and 2B, together. TeraFET symbol 220 includes a TeraFET 222, a source antenna 224, and a drain antenna 226. In an embodiment, a distance between the source antenna 224 and the drain antenna 226, i.e., "antenna separation", is in the range of ⅛ and ¼ of a wavelength of the incident radiation signal 201 impinging example TeraFET architecture 220. TeraFET 222 includes a channel 228, a gate 230, a source 232, and a drain 234. The source antenna 224 is coupled to the source 222, and the drain antenna 226 is coupled to the drain 234. The channel 228 extends between the source 232 in the drain 234. Similar to the TeraFET architecture 200, the gate 230 is configured to couple to the detection module 140 and to receive a control input from the detection module 140. The source 232 and drain 234 are similarly configured to couple to the detection module 140 and to provide direction circuitry output to the detection module 140, as described herein.

In operation, TeraFET 200 may be configured to detect incoming radiation, e.g., incident radiation 201 (i.e., incident radiation signal). The incident radiation 201 may impinge TeraFET at an angle, $\varphi_i$, relative to a surface of TeraFET 200. For example, the surface may correspond to a surface of a source antenna and a surface of a drain antenna, e.g., source antenna 204 or 224, and drain antenna 206 or 226. For a linear polarization, e.g., as illustrated in FIG. 2A, a finite phase shift, $\theta_i$, between antenna 204 and antenna 206 output signals and proportional to $\sin(\varphi_i)$, appears for the incidence angle $\varphi_i$. It should be noted that the subscript, i, for both the finite phase shift and the incident angle, is configured to indicate a respective TeraFET, respective channel or respective channel portion, as will be described in more detail below. It may be appreciated that a proportionality coefficient in this equation is related to a geometry detail. The phase shift may then enter boundary conditions for an electron fluid in the corresponding transistor channel, as described herein.

The phase shift $\theta_i$ may be related to $L_{eff}/\lambda$, where each $L_{eff}$ is determined by a respective source and drain antenna design and separation and $\lambda$ corresponds to THz radiation wavelength. In some situations, it may be assumed that $L_{eff} \ll \lambda$. A plasmonic-related dependence of the response may be governed by the parameter $L/\lambda_{pl}$, where $\lambda_{pl}$ is the wavelength of a plasma wave. In a resonant regime, $L/\lambda_{pl} \sim 1$, while the parameter $L_{eff}/\lambda$ may be, by assumption, much smaller than 1 and does not change essentially within a width of the plasmonic resonances. Thus, a dependence of $\theta$ (as well as $U_a$ (an amplitude of the incoming radiation 201) which is usually taken as phenomenological parameters of the model) on $L_{eff}/\lambda$ and, consequently, on the radiation frequency, focusing on plasmonic-related effects may be neglected. The respective voltage (U(0)) at a source, e.g., source 212, 232, and the respective voltage (U(L)) at a drain, e.g., drain 214, 234, of each TeraFET, respectively, may be defined as:

$$\begin{cases} U(0) = U_g + U_a \cos(\omega t) \\ U(L) = U_g + U_a \cos(\omega t + \theta) \end{cases} \quad (1)$$

where L is channel length, as described herein, $U_a$ corresponds to a THz voltage amplitude, $U_g$ corresponds to a gate-to-channel voltage swing (relative to a threshold voltage) and $\omega$ corresponds to an angular frequency of the impinging THz radiation.

U(0) and U(L) may thus correspond to boundary conditions for TeraFET 200. Solving standard hydrodynamic equations for a 2D electron fluid in channel 208 may then yield a corresponding dc voltage (V):

$$V = \frac{\beta \omega U_a^2 \sin\theta}{4U_g |\sin(kL)|^2 \sqrt{\omega^2 + \gamma^2}} \quad (2)$$

where:

$$\beta = 8\sinh\left(\frac{\Gamma L}{s}\right)\sin\left(\frac{\Omega L}{s}\right), k = (\Omega + i\Gamma)/s, \text{ and}$$

$$\Omega = \sqrt{\frac{\sqrt{\omega^4 + \omega^2\gamma^2}}{2} + \frac{\omega^2}{2}}, \Gamma = \sqrt{\frac{\sqrt{\omega^4 + \omega^2\gamma^2}}{2} - \frac{\omega^2}{2}}$$

where: k is the wave vector, $\omega$ is frequency, $\Omega$ is plasma frequency, $\Gamma$ is effective damping rate, $s=\sqrt{eU_g/m}$ is plasma wave velocity, e is electron charge, m is effective mass, and $\gamma$ corresponds to inverse momentum relaxation time.

In the resonant regime, $\omega \gg \gamma$, $s/L \gg \gamma$, and upon simplification:

$$\Omega \approx \omega, \Gamma \approx \frac{\gamma}{2}, \Omega \gg \Gamma, \text{ and} \quad (3)$$

$$V \approx \frac{4\delta\omega\gamma(-1)^N}{4U_g\left(\delta\omega^2 + \frac{\gamma^2}{4}\right)} U_a^2 \sin\theta$$

corresponding to a relatively sharply-peaked response at resonant frequencies $\omega_N = \pi Ns/L$ where $\delta\omega = \omega - \omega_N \ll \omega_N$, N=1, 2, 3, .... In both a resonant and non-resonant regime, Eq. (2) exhibits a periodic variation with frequency, with the response becoming zero for $\Omega = \Omega_N = \pi sN/L$. Thus, a TeraFET may be used as a spectrometer.

In operation, for each frequency, a gate to source voltage may be adjusted until the response is zero for all incidence angles, thus yielding values of frequency that satisfy:

$$\sqrt{\frac{\sqrt{\omega_N^4 + \omega_N^2\gamma^2}}{2} + \frac{\omega_N^2}{2}} = \frac{\pi s}{L}N \quad (4)$$

It may be appreciated that a dependence of $\omega_N$ on gate voltage may be determined from Equation (4). It may be appreciated that increasing the gate voltage corresponds to an increase in the frequency, $\omega_N$. Thus, for a monochromatic signal with a frequency, $\omega$, $\omega_N$ can be tuned to equal $\omega$ by adjusting the gate voltage, allowing measurement of $\omega$. For radiation with a spectrum broadened around $\bar{\omega}$ within an interval $\Delta\omega$, with wave amplitude given by $U_\alpha(\omega)$, the dc response may be found by replacing $U_\alpha$ in Equation (2) with $U_\alpha(\omega)$ and integrating over $\omega$. Tuning (i.e., adjusting) the resonant frequency $\omega_N$ to cover the interval $\bar{\omega} \pm \Delta\omega$ using the gate voltage may then allow extraction of a spectral density $|U_\alpha(\omega)|^2$.

Thus, control signal 141, from detection module 140 to detection circuitry 134 may be configured to adjust a gate voltage of a TeraFET, in the presence of an incident radiation signal, to determine a frequency of the incident signal. A line of sight detector that includes a TeraFET architecture, e.g., TeraFET architecture 200, 220, may then be utilized to determine the frequency of the signal, e.g., incident radiation 201. Additionally or alternatively, detection circuitry 134 and detection module 140 may be configured to determine incident signal intensity, $U_a$.

In operation, initially calibration operations may be performed. The calibration operations are configured to capture TeraFET architecture-related parameters, and thus are related to an architecture. For example, the calibration results are configured to relate incident radiation angle, $\varphi_i$, to TeraFET dc output voltage, V, to facilitate determining $\varphi_i$ based, at least in part, on measured V, during operation.

In the following, each example TeraFET architecture is generally drawn similar to the symbolic architecture 220. The example TeraFET architectures illustrated in FIG. 3 through FIG. 10 include symbolic architecture(s) drawn for ease of illustration and not of limitation. As used herein, "architecture" and "topology" are used interchangeably. As used herein, each line of sight detector may include or correspond to a TeraFET architecture that includes at least one TeraFET and a plurality of antennas. Generally, each antenna in a line of sight detector may be positioned within one wavelength of the incident sub-terahertz or terahertz signal from each other antenna. In other words, a maximum separation between antennas may correspond to one wavelength. A separation between two antennas coupled to a single TeraFET, e.g., antennas 224, 226 and TeraFET 222, may be in the range of ⅛ wavelength to ¼ wavelength of a received sub terahertz or terahertz signal (i.e., incident radiation signal). Each line of sight detector may be configured to receive a detection module control input, as described herein, and to provide detection circuitry outputs to, for example, a directional antenna subsystem, as described herein. For example, each TeraFET gate may be configured to receive the control input to facilitate determination of a frequency (or frequency range) of the incident radiation signal. Detection circuitry outputs may include, for example, TeraFET output voltage, V, as described herein.

Figure 3:
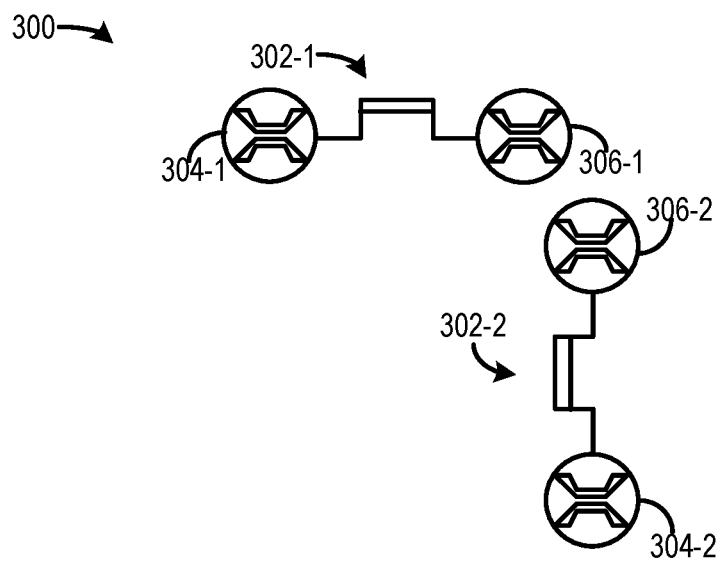
FIG. 3 illustrates an example TeraFET topology configured for terahertz signal detection, that includes four antennas, consistent with several embodiments of the present disclosure.

FIG. 3 illustrates an example TeraFET topology 300 configured for terahertz signal detection, that includes four antennas 304-1, 306-1, 304-2, 306-2, consistent with several embodiments of the present disclosure. In this example, a first antenna 304-1 corresponds to a first source antenna, a second antenna 306-1 corresponds to a first drain antenna, a third antenna 304-2 corresponds to a second source antenna, and a fourth antenna 306-2 corresponds to a second drain antenna. TeraFET architecture 300 includes a first TeraFET 302-1 and a second TeraFET 302-2. Thus, the first TeraFET 302-1, first source antenna 304-1, and first drain antenna 306-1 correspond to symbolic view 220 of FIG. 2B, and thus, the TeraFET architecture 200 of FIG. 2A. Similarly, the second TeraFET 302-2, second source antenna 304-2, and second drain antenna 306-2 correspond to symbolic view 220, and the TeraFET architecture 200.

In an embodiment, the second TeraFET 302-2 may be oriented at an angle relative to the first TeraFET 302-1. In an embodiment, each antenna 304-1, 306-1, 304-2, 306-2 may be positioned within one wavelength (of the sub-terahertz or terahertz signal) from each other antenna. In other words, a maximum separation between antennas may correspond to one wavelength. Each TeraFET 302-1, 302-2 may be configured to receive a detection module control input, as described herein, and to provide detection circuitry outputs, as described herein.

In one nonlimiting example, the first TeraFET 302-1 may be understood as configured to sense in an x-direction, and the second TeraFET 302-2 may be configured to sense in a y-direction relative to the first TeraFET 302-1 in an x, y coordinate system. In other words, an orientation of the second TeraFET 302-2 may correspond to an angle of 90° relative to an orientation of the first TeraFET 302-1. As used herein, numerical values may be understood as corresponding to the given value to within manufacturing tolerances. In another example, the orientation of the second TeraFET 302-2 relative to the first TeraFET 302-1 may be less than 90°.

In operation, incident radiation signal may impinge a line of sight detector that includes TeraFET architecture 300. Generally, the incident radiation signal may propagate in a direction into the page. The page may then correspond to a plane, in an x, y coordinate system. In other words, each incident angle, $\varphi_i$, (i=1, 2) may be measured from a normal to the page. For i=1, and angle, $\varphi_1$, associated with the first TeraFET 302-1 and antennas 304-1 and 306-1, the first TeraFET 302-1 is configured to provide x-direction information. For i=2, and angle $\varphi_2$, associated with the second TeraFET 302-2 and antennas 304-2 and 306-2, and an angle between the first and second TeraFETs 302-1, 302-2 of 90°, the second TeraFET 302-2 may then be configured to provide y-direction information. Thus, TeraFET architecture 300 is configured to capture incident radiation impinging at an angle relative to a plane, the plane parallel to a surface of the TeraFET architecture 300 and corresponding line of sight detector.

Figure 4:
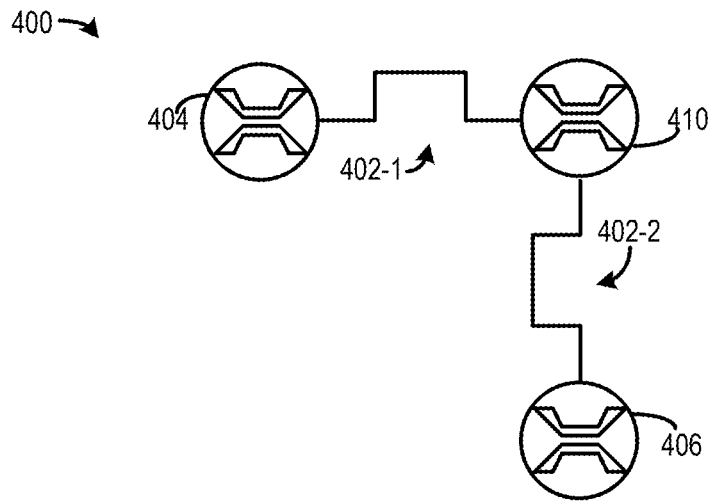
FIG. 4 illustrates an example TeraFET topology configured for terahertz signal detection, that includes three antennas, consistent with several embodiments of the present disclosure.

FIG. 4 illustrates an example TeraFET topology 400 configured for terahertz signal detection, that includes three antennas 404, 406, 410, consistent with several embodiments of the present disclosure. TeraFET architecture 400 includes a first TeraFET 402-1 and a second TeraFET 402-2. In an embodiment, the second TeraFET 402-2 may be oriented at an angle relative to the first TeraFET 402-1. It may be appreciated that the orientation of the second TeraFET 402-2 relative to the first TeraFET 402-1 corresponds to an orientation of a channel of the second TeraFET 402-2 relative to a channel of the first TeraFET 402-1. In one nonlimiting example, the angle may be less than or equal to 90°. In an embodiment, each antenna 404, 406, 410 may be positioned within one wavelength of the sub-terahertz or terahertz signal from each other antenna. In other words, a maximum separation between antennas may correspond to one wavelength. In an embodiment, antenna 404 may be between one eighth and one quarter wavelength from antenna 410, and antenna 406 may be between one eighth and one quarter wavelength from antenna 410. Each TeraFET 402-1, 402-2 may be configured to receive a detection module control input, as described herein, and to provide detection circuitry outputs, as described herein.

In this example TeraFET architecture 400, a third antenna 410 may correspond to a drain antenna (with respect to the first TeraFET 402-1) combined with a source antenna (with respect to the second TeraFET 402-2). Thus, a first antenna 404 may correspond to the first source antenna 304-1 and a second antenna 406 may correspond to the second drain antenna 306-2, of, for example, TeraFET architecture 300 of FIG. 3.

In operation, incident radiation signal may impinge a line of sight detector that includes TeraFET architecture 400. Operation may be generally similar to the operation of TeraFET architecture 300, as described herein. Thus, TeraFET architecture 400 is configured to capture incident radiation impinging at an angle relative to a plane, the plane parallel to a surface of the TeraFET architecture 400 and corresponding line of sight detector.

Figure 5:
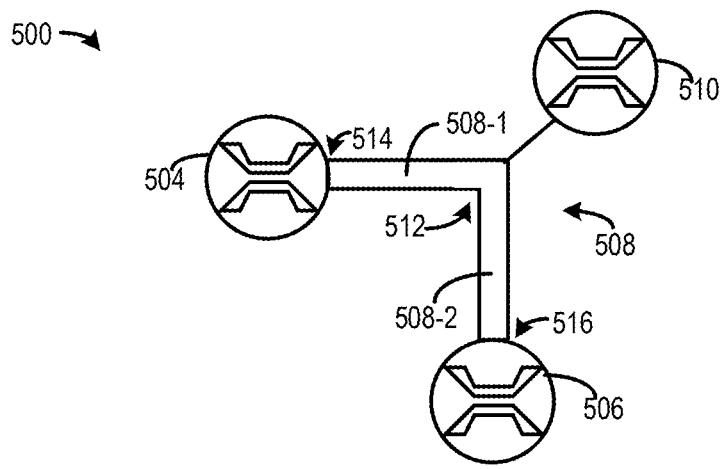
FIG. 5 illustrates an example TeraFET topology configured for terahertz signal detection, that includes a TeraFET portion with an angled channel and a midpoint antenna, consistent with several embodiments of the present disclosure.

FIG. 5 illustrates an example TeraFET topology 500 configured for terahertz signal detection, that includes a TeraFET portion with an angled channel 508 and a midpoint antenna 510, consistent with several embodiments of the present disclosure. TeraFET architecture 500 further includes a source antenna 504 and a drain antenna 506. The angled channel 508 has a first portion 508-1 and a second portion 508-2 coupled at the angle point 512. The source antenna 504 is coupled to a source 514 at or near a first end of the channel 508, i.e., at or near a first end of the first channel portion 508-1. The drain antenna 506 is coupled to a drain 516 at or near an opposing second end of the channel 508, i.e., at or near a second end of the second channel portion 508-2. In this example 500, the midpoint antenna 510 is coupled to the angled channel 508 at or near an angle point 512 in the channel 508. For example, the angle point 512 may be at or near a midpoint of the channel 508. In one nonlimiting example an angle of the channel at the angle point 512 may be 90°. In another example, the angle of the channel at the angled point 512 may be greater than 90° or less than 90°.

In an embodiment, each antenna 504, 506, 510 may be positioned within one wavelength (of the sub-terahertz or terahertz signal) from each other antenna. In other words, a maximum separation between antennas may correspond to one wavelength. TeraFET architecture 500 is shown without a gate, in order to illustrate the angled channel 508 structure and coupling of the midpoint antenna 510. It should be noted that, in operation, a gate is included, configured to receive control inputs, as describe herein.

Figure 6:
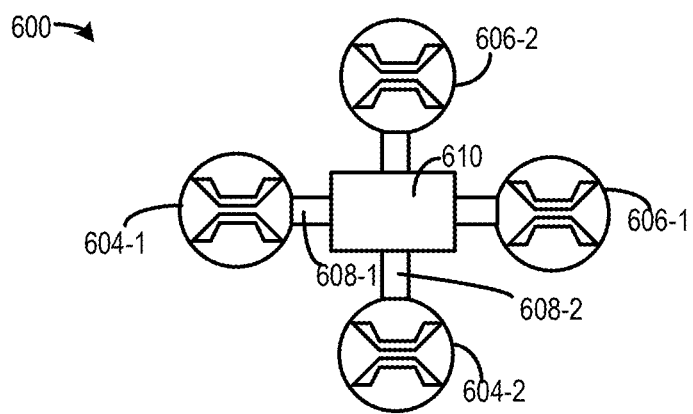
FIG. 6 illustrates an example TeraFET topology configured for terahertz signal detection, that includes four antennas in a cross configuration, consistent with several embodiments of the present disclosure.

FIG. 6 illustrates an example TeraFET topology 600 configured for terahertz signal detection, that includes four antennas 604-1, 606-1, 604-2, 606-2, in a cross configuration, consistent with several embodiments of the present disclosure. Example TeraFET architecture 600 may be understood as a "cross-TeraFET", as described herein. TeraFET architecture 600 includes a first channel 608-1 coupling a first source antenna 604-1 and a first drain antenna 606-1, and a second channel 608-2 coupling a second source antenna 604-2 and a second drain antenna 606-2. TeraFET architecture 600 further includes a gate 610 that overlaps a crossing point of the respective channels 608-1, 608-2.

In an embodiment, the second channel 608-2 may be oriented at an angle relative to the first channel 608-1. In one nonlimiting example, the angle may be less than or equal to 90°. In an embodiment, each antenna 604-1, 604-2, 606-1, 606-2 may be positioned within one wavelength of the incident radiation signal (i.e., sub-terahertz or terahertz signal) from each other antenna. In other words, a maximum separation between antennas may correspond to one wavelength. In an embodiment, antenna 604-1 may be between one eighth and one quarter wavelength from antenna 606-1, and antenna 604-2 may be between one eighth and one quarter wavelength from antenna 606-2. Gate 610 may be configured to receive a detection module control input, as described herein, and TeraFET architecture 600 may be configured to provide detection circuitry outputs, as described herein.

In operation, incident radiation signal may impinge a line of sight detector that includes TeraFET architecture 600. Operation may be generally similar to the operation of TeraFET architecture 300, as described herein. Thus, TeraFET architecture 600 is configured to capture incident radiation impinging at an angle relative to a plane, the plane parallel to a surface of the TeraFET architecture 600 and corresponding line of sight detector.

Figure 7:
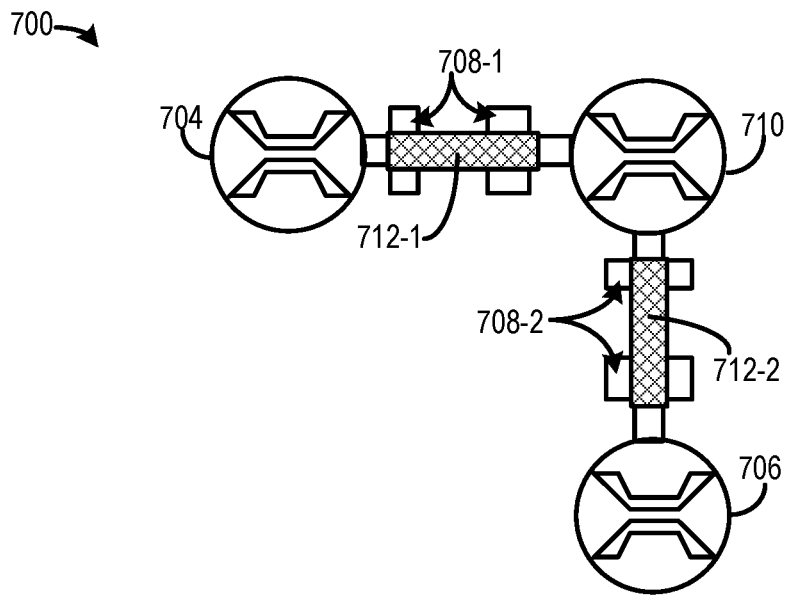
FIG. 7 illustrates an example TeraFET topology configured for terahertz signal detection, that includes TeraFETs with variable width channels, consistent with several embodiments of the present disclosure.

FIG. 7 illustrates an example TeraFET topology 700 configured for terahertz signal detection, that includes TeraFETs with variable width channels 708-1, 708-2, consistent with several embodiments of the present disclosure. In one nonlimiting example, TeraFET architecture 700 may be implemented using one or more variable width plasmonic crystal TeraFET(s). Variable width plasmonic crystal TeraFET(s) may provide increased sensitivity. TeraFET architecture 700 may be utilized in place of other TeraFET architectures (that may include constant channel widths), as described herein. Replacing another TeraFET architecture with example TeraFET architecture 700 may then provide increased sensitivity for the corresponding line of sight detector.

TeraFET architecture 700 includes a source antenna 704, a drain antenna 706, and a midpoint antenna 710. A first variable width channel 708-1 is coupled between the source antenna 704 and the midpoint antenna 710. A second variable width channel 708-2 is coupled between the midpoint antenna 710 and the drain antenna 706. The first variable width channel 708-1 may be coupled to a first gate 712-1 and the second variable width channel 708-2 may be coupled to a second gate 712-2. The second channel 708-2 is oriented at an angle relative to the first channel 708-1. In one nonlimiting example, the angle may be 90°. In another example, the angle may be greater than 90° or less than 90°.

In one example, each channel 708-1, 708-2 may correspond to a respective TeraFET, for example, similar to the TeraFET architecture 400 of FIG. 4. In another example, each channel 708-1, 708-2 may correspond to a respective portion of a same channel of a TeraFET, for example, similar to the TeraFET architecture 500 of FIG. 5.

In operation, incident radiation signal may impinge a line of sight detector that includes TeraFET architecture 700. Operation may be generally similar to the operation of TeraFET architecture 300, as described herein. Thus, TeraFET architecture 700 is configured to capture incident radiation impinging at an angle relative to a plane, the plane parallel to a surface of the TeraFET architecture 700 and corresponding line of sight detector.

Figure 8:
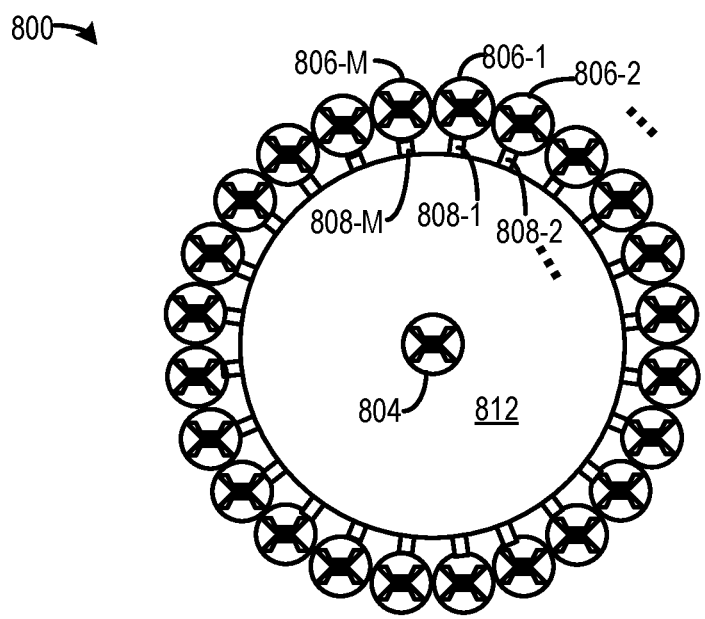
FIG. 8 illustrates an example TeraFET topology configured for terahertz signal detection for a plurality of transmitting sources, consistent with several embodiments of the present disclosure.

FIG. 8 illustrates an example TeraFET topology 800 configured for terahertz signal detection for a plurality of transmitting sources, consistent with several embodiments of the present disclosure. TeraFET architecture 800 includes a central source antenna 804, a gate 812, a plurality of drain antennas 806-1, 806-2, ..., 806-M, and a plurality of channels 808-1, 808-2, ..., 808-M. A shape of the gate 812 is generally an annulus, i.e., generally circular with a centered circular void. In other words, the gate may define a void configured to accommodate the source antenna 804. The central source antenna 804 is positioned at a center of the gate 812. The plurality of drain antennas 806-1, 806-2, ..., 806-M are distributed generally in a circle positioned outside of an outer circumference of the gate 812. Each channel 808-1, 808-2, ..., 808-M is coupled between the source antenna 804 and a respective drain antenna 806-1, 806-2, ..., 806-M. In this example, M equals 24 and an angle between adjacent channels is about 15 degrees. However, this disclosure is not limited in this regard.

TeraFET architecture 800 is configured to allow a determination of a plurality of directions to a plurality of transmission sources, simultaneously. For example, TeraFET architecture 800 may be utilized to determine a direction of a strongest signal relative to other signals when there is a plurality of transmitting sources. The direction of the strongest signal may be determined based, at least in part, on detected signal strength and determined incidence angle associated with the source antenna, pairs of TeraFET channels and corresponding drain antennas. It may be appreciated that the pairs of channels and corresponding drain antennas may generally not be adjacent, in this example. For example, the pairs of channels may be selected such that an angle between the channels at least approaches 90°. However, this disclosure is not limited in this regard. The control input may be provided to the gate 812, thus configuring TeraFET architecture 800 to provide simultaneous outputs. In one nonlimiting example, identifying the direction of the strongest signal may be used for switching from a first cell to a second cell when the corresponding computing device is mobile. In another example, identifying the direction of the strongest signal from a plurality of robotic sources may be used for robotic swarms to coordinate robotic swarm motion.

Figure 9:
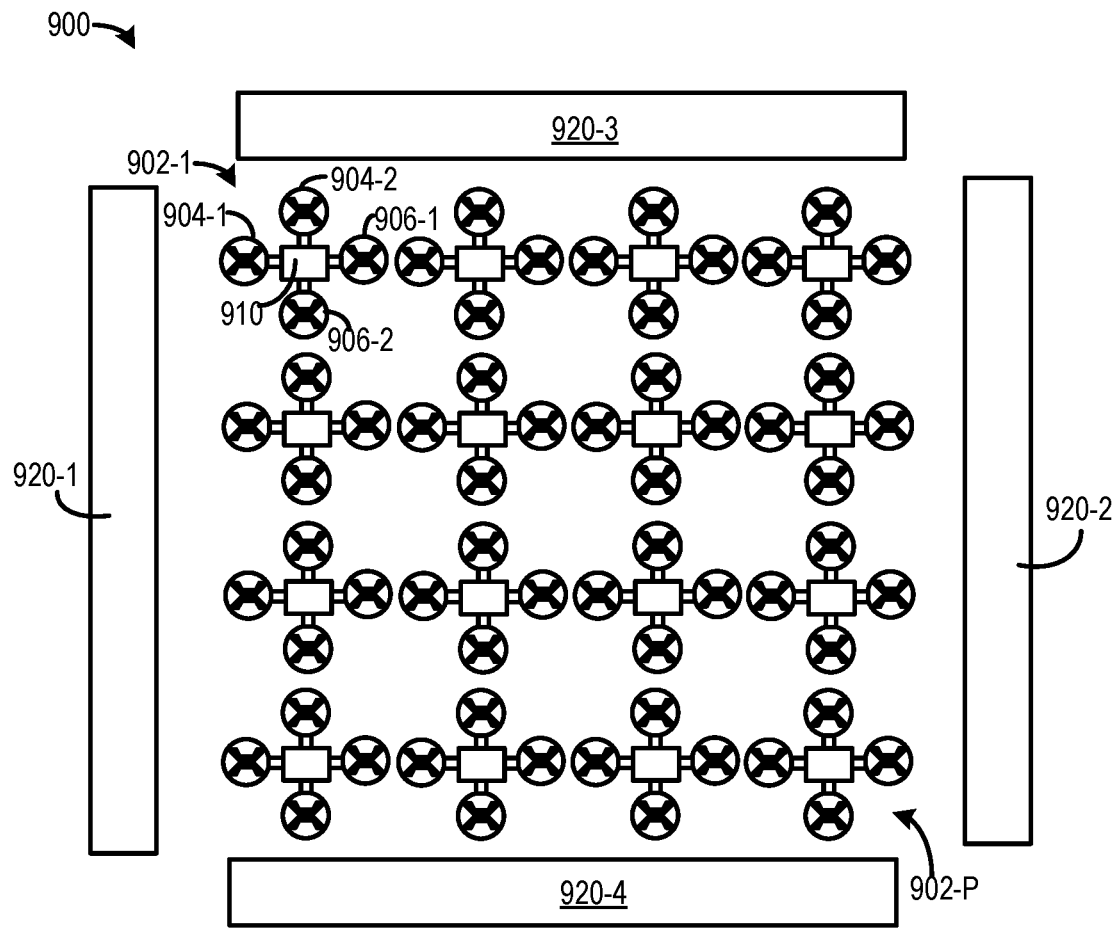
FIG. 9 illustrates an example TeraFET topology configured for terahertz signal detection, that includes a plurality of cross-configuration TeraFETs forming a focal plane array, consistent with several embodiments of the present disclosure.

FIG. 9 illustrates an example TeraFET topology 900 configured for terahertz signal detection, that includes a plurality of cross-configuration TeraFETs ("cross-TeraFETs") forming a focal plane array, consistent with several embodiments of the present disclosure. TeraFET architecture 900 includes an array of cross-TeraFETs 902-1, ..., 902-P. Each cross-TeraFET, e.g., cross-TeraFET 902-1, may correspond to example TeraFET architecture 600 of FIG. 6. In other words, each cross-TeraFET 902-1, ..., 902-P in this example 900 corresponds to a cross configuration. In this example TeraFET architecture 900, the array includes 16 cross-TeraFETs, i.e., P=16. However, this disclosure is not limited in this regard. TeraFET architecture 900 includes four readout blocks 920-1, 920-2, 920-3, 920-4, configured to capture the outputs from each cross-TeraFET. TeraFET architecture 900 may be configured to provide a relatively more precise location. In one nonlimiting example, a line of sight detector corresponding to TeraFET architecture 900 may be positioned on a surface of a computing device, e.g., smart phone, tablet computer, laptop computer, smart watch, as described herein.

Figure 10:
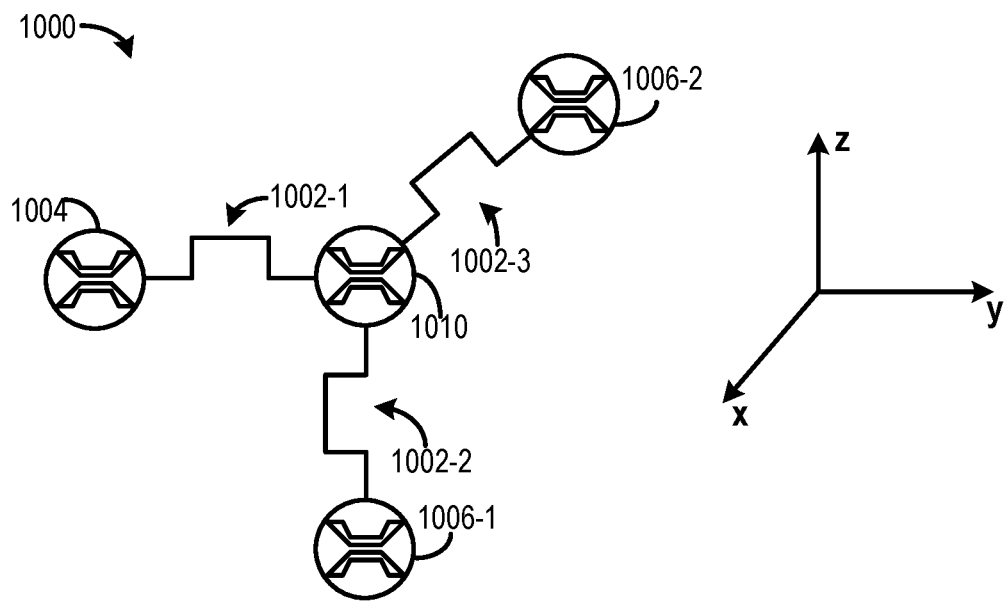
FIG. 10 illustrates an example TeraFET topology configured for terahertz signal detection in three dimensions, consistent with several embodiments of the present disclosure.

FIG. 10 illustrates an example TeraFET topology 1000 configured for terahertz signal detection in three dimensions, consistent with several embodiments of the present disclosure. TeraFET architecture 1000 includes four antennas 1004, 1006-1, 1006-2, 1010. TeraFET architecture 1000 includes a first TeraFET 1002-1, a second TeraFET 1002-2, and a third TeraFET 1002-3. In one nonlimiting example, the first TeraFET 1002-1 may be understood as configured to sense in an x-direction, the second TeraFET 1002-2 may be configured to sense in a y-direction, and the third TeraFET 1002-3 may be configured to sense in a z-direction, in an x, y, z coordinate system. In other words, an orientation of the each TeraFET relative to each other TeraFET may correspond to an angle of 90°. A line of sight detector that includes TeraFET architecture 1000 may thus be configured to determine a direction of a transmitting source in three-dimensional space. Any two TeraFETs may be configured to determine a direction of a transmitting source with respect to a plane, while the three TeraFETs in the TeraFET architecture 1000 are configured to determine the direction of the transmitting source in three-dimensional space.

In this example TeraFET architecture 1000, a fourth antenna 1010 may correspond to a drain antenna (with respect to the first TeraFET 1002-1) combined with a source antenna (with respect to the second TeraFET 1002-2). Thus, a first antenna 1004 may correspond to the first source antenna 304-1 and a second antenna 1006-1 may correspond to the second drain antenna 306-2, of, for example, TeraFET architecture 300 of FIG. 3. The fourth antenna 1006-2 may correspond to a second drain antenna.

Thus, a line-of-sight detector may be configured to detect incident sub-THz and THz radiation signals and to determine a direction of an incident radiation signal source based, at least in part, on an induced voltage in at least one TeraFET. The induced voltage is related to an angle of the incident radiation impinging on a line of sight detector that includes the at least one TeraFET. In some embodiments, the line of sight detector may be configured to determine a frequency of the incident radiation signal. In some embodiments, the line of sight detector may be configured to determine a signal intensity of the incident radiation signal. The direction information may then be provided to a directional antenna subsystem, i.e., "main antenna", that may then be aimed based, at least in part, on the direction information. Thus, line of sight communication may be facilitated by a line of sight detector, according to the present disclosure.

Figure 11:
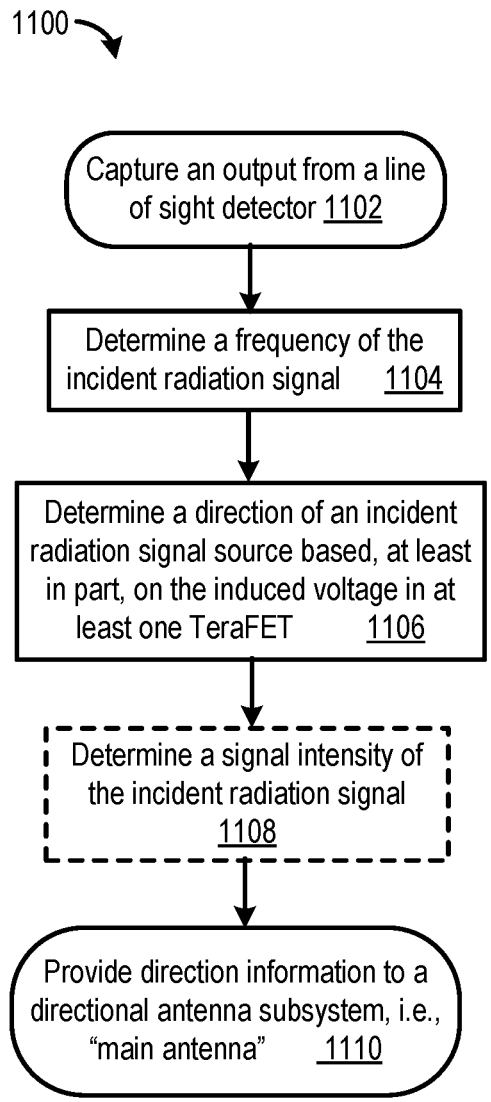
FIG. 11 is a flowchart of line of sight operations according to various embodiments of the present disclosure.

FIG. 11 is a flowchart of line of sight operations according to various embodiments of the present disclosure. In particular, the flowchart 1100 illustrates detecting a direction of a transmitting source. The operations may be performed, for example, by detection circuitry 134, detection module 140, and/or communication module 136 of FIG. 1.

Operations of this embodiment may begin with capturing an output from a line of sight detector at operation 1102. For example, the output may correspond to an induced voltage in at least one TeraFET. The induced voltage is related to an angle of incident radiation impinging on the line of sight detector that includes the at least one TeraFET. Operation 1104 includes determining a frequency of the incident radiation signal. Operation 1106 includes determining a direction of an incident radiation signal source based, at least in part, on the induced voltage in the at least one TeraFET. In some embodiments, operation 1108 may include determining a signal intensity of the incident radiation signal. Operation 1110 includes providing direction information to a directional antenna subsystem, i.e., "main antenna", that may then be aimed based, at least in part, on the direction information.

Thus, a direction of a transmitting source may be determined based, at least in part, on an output from a line of sight detector that includes a TeraFET coupled to a plurality of antennas.

Figure 12:
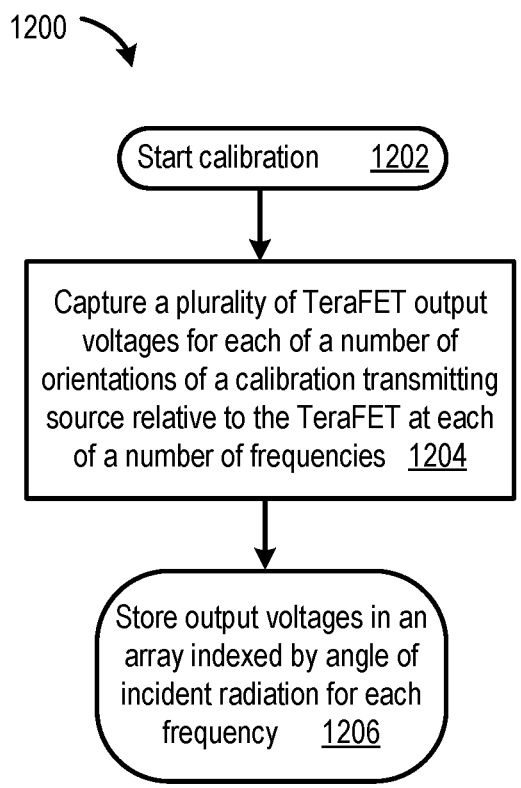
FIG. 12 is a flowchart of calibration operations according to various embodiments of the present disclosure.

FIG. 12 is a flowchart of calibration operations according to various embodiments of the present disclosure. In particular, the flowchart 1200 illustrates calibrating a line of sight detector. The operations may be performed, for example, by calibration module 138, detection module 140 and/or detection circuitry 134 of FIG. 1.

Operations of this embodiment may begin with start calibration at operation 1202. A plurality of TeraFET output voltages may be captured for each of a number of orientations of a calibration transmitting source relative to the TeraFET at each of a number of frequencies at operation 1204. The output voltages may be stored in an array indexed by angle of incident radiation for each frequency at operation 1206.

Thus, a relationship between an output voltage from a TeraFET and an angle of an incident radiation signal impinging on a plurality of antennas coupled to the TeraFET may be determined.

Generally, this disclosure relates to a line-of-sight detector, in particular to, a line-of-sight detector and communication system in sub-THz (terahertz) and THz ranges. An apparatus, method and/or system are configured to detect a direction of an incident radiation signal source based, at least in part, on an induced voltage in at least one TeraFET. The induced voltage is related to an angle of the incident radiation impinging on a line of sight detector that includes the at least one TeraFET. In some embodiments, the line of sight detector may be configured to determine a frequency of the incident radiation signal. In some embodiments, the line of sight detector may be configured to determine a signal intensity of the incident radiation signal. The direction information may then be provided to a directional antenna subsystem, i.e., "main antenna", that may then be aimed based, at least in part, on the direction information. Thus, line of sight communication may be facilitated by a line of sight detector, according to the present disclosure.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processors 110, 310 executing code and/or instructions sets (e.g., software, firmware, etc.) corresponding to the functionality described herein, thus transforming a general-purpose processor into a specific-purpose processing environment to perform one or more of the operations described herein.

Memory circuitry 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A line of sight detector comprising:
   a first TeraFET (field effect transistor) comprising a first source, a first drain, a first gate, and a first channel having a first end and a second end;
   a first source antenna coupled to the first source;
   a first drain antenna coupled to the first drain; and
   a third antenna, each antenna configured to receive an incident radiation signal having a frequency in a sub terahertz or a terahertz frequency range, each antenna positioned a respective distance from each other antenna, each distance less than one wavelength of the incident radiation signal.

2. The line of sight detector of claim 1, wherein a distance between the first source antenna and the first drain antenna is between one eighth and one quarter of the wavelength of the incident radiation signal.

3. The line of sight detector of claim 1, wherein a width of the first channel is variable.

4. The line of sight detector according to claim 1, wherein the first channel is an angled channel having a first portion and a second portion coupled at an angle point, the third antenna is coupled to the first channel at the angle point, a first end of the first portion coupled to the first source antenna, and a second end of the second portion coupled to the first drain antenna.

5. The line of sight detector according to claim 1, further comprising a second TeraFET comprising a second source, a second drain, a second gate, and a second channel, the second source coupled to the first drain antenna, the second drain coupled to the third antenna, the second channel oriented at an angle relative to the first channel.

6. The line of sight detector according to claim 1, further comprising a second TeraFET, and a fourth antenna, the second TeraFET comprising a second source, a second drain, and a second gate, the third antenna coupled to the second source, and the fourth antenna coupled to the second drain.

7. The line of sight detector according to claim 1, further comprising a fourth antenna, wherein the first TeraFET further comprises a second source and a second drain, the third antenna is coupled to the second source, the fourth antenna is coupled to the second drain, and the channel has a cross shape.

8. The line of sight detector according to claim 1, further comprising a second channel coupled between the first source antenna and the third antenna;
   a plurality of other channels; and
   a plurality of other drain antennas equal in number to the plurality of other channels, each other channel coupled between the first source antenna and a respective other drain antenna, an arrangement of the drain antennas configured to facilitate simultaneous determination of respective directions to a plurality of incident signal sources.

9. The line of sight detector according to claim 1, wherein the first TeraFET comprises a material selected from the group comprising Si (silicon), GaAs (gallium-arsenide), GaN (gallium nitride), and graphene.

10. The line of sight detector according to claim 1, further comprising a second TeraFET, a third TeraFET, and a fourth antenna, the second TeraFET coupled between the first drain antenna and the third antenna, the third TeraFET coupled between the first drain antenna and the fourth antenna, each TeraFET oriented perpendicular to each other TeraFET to within manufacturing tolerances, and configured to determine a direction to a source of incident radiation in three-dimensional space.

11. A system for line of sight signal detection, the system comprising:
   a detection circuitry comprising a line of sight detector; and
   a detection module configured to determine a line of sight direction to a transmitting source based, at least in part, on an output of the detection circuitry, the line of sight detector comprising a first TeraFET (field effect transistor) comprising a first source, a first drain, a first gate, and a first channel having a first end and a second end;
   a first source antenna coupled to the first source;
   a first drain antenna coupled to the first drain; and
   a third antenna, each antenna configured to receive an incident radiation signal having a frequency in a sub terahertz or a terahertz frequency range, each antenna positioned a respective distance from each other antenna, each distance less than one wavelength of the incident radiation signal.

12. The system of claim 11, wherein a distance between the first source antenna and the first drain antenna is between one eighth and one quarter of the wavelength of the incident radiation signal.

13. The system of claim 11, wherein a width of the first channel is variable.

14. The system according to claim 11, wherein the detection circuitry comprises a plurality of line of sight detectors arranged in a focal plane array.

15. The system according to claim 11, wherein the detection module is configured to provide the determined line of sight direction to a directional antenna subsystem.

16. The system according to claim 11, wherein the detection module is configured to determine a signal strength of the incident radiation signal.

17. The system according to claim 11, further comprising a calibration module configured to determine calibration data comprising a respective detection circuitry output for each orientation of a calibration transmitting source relative to the line of sight detector, the line of sight direction to a transmitting source determined based, at least in part, on the calibration data.

18. The system according to claim 11, wherein the detection circuitry further comprises a second TeraFET, a third TeraFET, and a fourth antenna, the second TeraFET coupled between the first drain antenna and the third antenna, the third TeraFET coupled between the first drain antenna and the fourth antenna, each TeraFET oriented perpendicular to each other TeraFET to within manufacturing tolerances, and configured to determine a direction to a source of incident radiation in three-dimensional space.

19. The system according to claim 11, wherein the detection circuitry further comprises a second channel coupled between the first source antenna and the third antenna;
   a plurality of other channels; and
   the a plurality of other drain antennas equal in number to the plurality of other channels, each other channel coupled between the first source antenna and a respective other drain antenna, an arrangement of the drain antennas configured to facilitate simultaneous determination of respective directions to a plurality of incident signal sources.

20. The system according to claim 11, wherein the first TeraFET comprises a material selected from the group comprising Si (silicon), GaAs (gallium-arsenide), GaN (gallium nitride), and graphene.

* * * * *